United States Patent
Zogg et al.

(10) Patent No.: US 9,594,167 B2
(45) Date of Patent: *Mar. 14, 2017

(54) GEODETIC REFERENCING OF POINT CLOUDS

(71) Applicant: Leica Geosystems AG, Heerbrugg (CH)

(72) Inventors: Hans-Martin Zogg, Uttwil (CH); Norbert Kotzur, Altstätten (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 391 days.

This patent is subject to a terminal disclaimer.

(21) Appl. No.: 14/245,799

(22) Filed: Apr. 4, 2014

(65) Prior Publication Data

US 2014/0300886 A1    Oct. 9, 2014

(30) Foreign Application Priority Data

Apr. 5, 2013  (EP) .................................. 13162634

(51) Int. Cl.
    *G01C 3/08*    (2006.01)
    *G01S 17/89*   (2006.01)
    (Continued)

(52) U.S. Cl.
    CPC ............ *G01S 17/89* (2013.01); *G01C 15/002* (2013.01); *G01S 7/4817* (2013.01); *G01S 17/06* (2013.01)

(58) Field of Classification Search
    CPC ....... G01C 15/002; G01S 17/89; G01S 17/06; G01S 7/4817
    (Continued)

(56) References Cited

U.S. PATENT DOCUMENTS

| 5,886,340 | A | 3/1999 | Suzuki et al. |
| 6,072,642 | A | 6/2000 | Shirai |

(Continued)

FOREIGN PATENT DOCUMENTS

| CN | 102947667 A | 2/2013 |
| DE | 197 107 22 A1 | 10/1997 |

(Continued)

OTHER PUBLICATIONS

European Search Report dated Sep. 16, 2013 as received in Application No. EP 13 16 2634.

*Primary Examiner* — Mark Hellner
(74) *Attorney, Agent, or Firm* — Maschoff Brennan (57) ABSTRACT

A geodetic surveying method includes deriving surface information for an object and geodetically accurate individual point measuring to at least one reference point. A position reference to an external coordinate system may also be provided by the at least one reference point. The method may also include aligning measurement radiation on the at least one reference point. The method may also include determining at least one direction to the reference point in an internal coordinate system. A method for reference point-independent scanning is also disclosed for deriving the surface information, the method may comprise scanning by continuously changing the alignment of the measurement radiation, determining a respective distance and a respective alignment of the measurement radiation emitted for a distance measurement for scanning points lying within the specified scanning region, and producing a point cloud representing the surface information and having the scanning points, in the internal coordinate system.

20 Claims, 4 Drawing Sheets

(51) Int. Cl.
*G01C 15/00* (2006.01)
*G01S 17/06* (2006.01)
*G01S 7/481* (2006.01)

(58) Field of Classification Search
USPC ........................................................ 356/4.01
See application file for complete search history.

(56) References Cited

U.S. PATENT DOCUMENTS

| | | | |
|---|---|---|---|
| 6,433,858 | B1 | 8/2002 | Suzuki |
| 6,504,602 | B1 | 1/2003 | Hinderling |
| 6,879,384 | B2 | 4/2005 | Riegl et al. |
| 7,583,373 | B2 | 9/2009 | Schwarz |
| 7,672,049 | B2 | 3/2010 | Fruhmann et al. |
| 8,533,967 | B2 | 9/2013 | Bailey et al. |
| 9,377,298 | B2 * | 6/2016 | Zogg .................... G01C 15/002 |
| 2003/0123045 | A1 | 7/2003 | Riegl et al. |
| 2005/0057745 | A1 * | 3/2005 | Bontje ................. G01C 15/002 356/139.03 |
| 2006/0110026 | A1 * | 5/2006 | Strassenburg-Kleciak G01C 15/00 382/154 |
| 2012/0014564 | A1 | 1/2012 | Jensen |
| 2012/0057174 | A1 | 3/2012 | Briggs |

FOREIGN PATENT DOCUMENTS

| | | |
|---|---|---|
| DE | 199 267 06 A1 | 12/1999 |
| DE | 199 495 80 A1 | 4/2000 |
| EP | 1 081 459 A1 | 3/2001 |
| EP | 1 321 777 A2 | 6/2003 |
| EP | 1 662 278 A1 | 5/2006 |
| EP | 1 686 350 A1 | 8/2006 |
| EP | 2 141 450 A1 | 1/2010 |
| EP | 2 219 011 A1 | 8/2010 |

\* cited by examiner

GEODETIC REFERENCING OF POINT CLOUDS

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not applicable.

BACKGROUND OF THE INVENTION

Field of the Invention

Embodiments of the invention relate to a geodetic surveying method for referencing a coordinate system, a geodetic surveying device and a computer program product.

Description of Related Art

For surveying a target point, numerous geodetic surveying devices have been known since antiquity. In this case, direction or angle and usually also distance from a measuring device to the target point to be surveyed are recorded and, in particular, the absolute position of the measuring device together with reference points possibly present are detected as spatial standard data.

Well-known examples of such geodetic surveying devices include theodolite, tachymeter and total station, which is also referred to as electronic tachymeter or computer tachymeter. One geodetic measuring apparatus from the prior art is described in the publication document EP 1 686 350, for example. Such devices have electrical-sensor-based angle and, if appropriate, distance measuring functions that permit direction and distance to be determined with respect to a selected target. In this case, the angle and distance variables are established in the internal reference system of the device and, if appropriate, also have to be linked to an external reference system for absolute position determination.

In many geodetic applications, points are surveyed by virtue of specifically configured target objects being positioned there. Said target objects consist usually of a plumb rod with a reflector (e.g. an all-round prism) for defining the measurement path or the measurement point. In such surveying problems, a quantity of data, instructions, speech and further information is transmitted between target object—in particular a portable data detection device on part of the target object—and central measuring device for controlling the measurement procedure and for setting or registering measurement parameters. Examples of such data include the identification of the target object (type of employed prism), inclination of the plumb rod, height of the reflector above the ground, reflector constants or measured values such as temperature or air pressure. This information or these situation-dependent parameters are required in order to enable highly precise sighting and surveying of the measurement point defined by the plumb rod with prism.

Modern total stations generally have a compact and integrated design, with coaxial distance measuring element and computer, control and storage units usually being present in a device. Depending on the configuration level of the total station, a motorization of the sighting or targeting apparatus and—when using retroreflectors (e.g. an all-round prism) as target objects—means for automated target search and tracking moreover can be integrated. As a human-machine interface, the total station can comprise an electronic display/control unit—generally a microprocessor computer unit with electronic data storage means—with a display and input means, e.g. a keyboard. Measurement data detected by electrical sensor means are fed to the display/control unit such that the position of the target point can be established, displayed optically and stored by the display/control unit. Total stations known from the prior art can furthermore comprise a radio data interface for establishing a radio connection to external peripheral components such as e.g. a portable data detection device, which, in particular, can be embodied as a data logger or a field computer.

For sighting or targeting the target point to be surveyed, generic geodetic surveying devices have a telescopic sight, such as e.g. an optical telescope, as sighting apparatus. In general, the telescopic sight can be rotated about a vertical axis and about a horizontal tilt axis relative to a base of the measuring device, such that the telescope can be aligned on the point to be surveyed by pivoting and tilting.

The optical system or the optical visual channel of the sighting apparatus usually contains an objective lens group, an image erection system, a focusing optical system and a cross-lines grid for producing a reticle and an eyepiece, which, for example, are arranged from the object side in this sequence. The position of the focusing lens group is set dependent on the object distance in such a way that an in-focus object image is produced on the cross-lines grid arranged in the focusing plane. This object image can then be observed through the eyepiece or detected by means of e.g. a coaxially arranged camera.

The structure of generic telescopic sights of geodetic devices is shown in EP 1 081 459 or EP 1 662 278 in an exemplary manner.

Since target objects (e.g. the plumb rods with target marker such as an all-round prism usually employed for geodetic purposes) cannot be sighted precisely enough (i.e. not satisfying the geodetic accuracy requirements) with the naked eye using the sighting apparatus, despite the often provided 30-times optical magnification, conventional surveying devices in the meantime have an automatic target tracking function for prisms serving as target reflector (ATR: "automatic target recognition") as a standard. For this, it is conventional for a further separate ATR light source—e.g. a multimode fiber output, which emits optical radiation with a wavelength in the region of 850 nm—and a specific ATR detector (e.g. CCD area sensor) sensitive to this wavelength to be additionally integrated into the telescope. By way of example, EP 2 141 450 describes a surveying device with a function for automatic sighting of a retro-reflecting target and with an automatic target tracking functionality.

Modern devices, in addition to the optical visual channel, can have a camera, which is integrated into the telescopic sight and aligned e.g. coaxially or in parallel, for detecting an image, wherein the detected image can be depicted, in particular, as live image on the display of the display/control unit and/or on a display of the peripheral device—such as e.g. of the data logger—used for remote control. In this case, the optical system of the sighting apparatus can have manual focus—e.g. an adjustment screw for changing the position of a focusing optical system—or an autofocus, wherein the focus position is changed by e.g. servomotors. By way of example, such a sighting apparatus of a geodetic surveying device is described in EP 2 219 011. Automatic focusing apparatuses for telescopic sights of geodetic devices are known from e.g. DE 197 107 22, DE 199 267 06 or DE 199 495 80.

By means of such an image detection unit, it is also possible to detect images of a measurement scene in addition to surveying specified target points. Hence, an object to be surveyed can be detected in the image and, optionally, displayed to a user on a display of the surveying device. Further information for the object can be derived on the basis of this image.

By means of appropriate image processing, it is possible, for example, to determine a surface condition for the object or a spatial extent of the object, at least in an approximate manner. Here, the spatial extent or the form of the object can be determined by means of edge extraction on the basis of the image.

For a more accurate determination of these object properties, it is possible to take account of position information for one or more points lying on the object in addition to the image information. To this end, the one point or the plurality of points are sighted and surveyed by the surveying device in an accurate fashion.

The points determined thus in terms of their position, as so-called support points, are processed together with the image information, as a result of which a more accurate statement can be made, for example about the position of the object part detected in the image.

A disadvantage in this case is that a large area topographic and geodetically accurate object survey cannot be made using a total station or means a disproportionately high time expenditure (compared to image detection of the object) since every point to be surveyed would have to be sighted individually and the position thereof would have to be determined in the case of a fixed alignment of the measurement radiation.

Moreover, determining the position of the object part imaged by the image can, in particular, only be undertaken depending on the determined support points and a high accuracy can only be achieved using a correspondingly large number of support points, wherein, furthermore, the form of the object part can likewise only be established with a very limited accuracy on the basis of image processing only (e.g. if the object has a curved surface).

At least one embodiment of the invention to provides an improved surveying device and a corresponding method, which enable improved, faster and more accurate large area object surveying of an object, in particular wherein the position of the object to be surveyed can be determined (in a geo-referenced fashion).

At least one embodiment provides for a corresponding surveying device, in particular a total station, wherein a more accurate object detection and, moreover, a provision of device-independent object coordinates for the object can be carried out.

At least one embodiment provides for a surveying device, by means of which measurement progress in respect of an absolute coordinate system (as an alternative to the internal reference system of the measuring device) can be monitored.

BRIEF SUMMARY OF THE INVENTION

The invention relates to a geodetic surveying method for referencing a coordinate system by means of a geodetic surveying device. Here, surface information for an object is derived in respect of an internal coordinate system of the geodetic surveying device, in particular in respect of a form and/or spatial extent of the object, and there is geodetically accurate individual point measuring to at least one reference point, wherein a position reference to an external coordinate system is provided by the at least one reference point, measurement radiation is aligned precisely on the at least one reference point and at least one direction to the reference point is determined in the internal coordinate system when the measurement radiation is aligned on the at least one reference point.

According to the invention, there additionally is reference point-independent scanning for deriving the surface information, comprising scanning of a scanning region, specified in respect of the object, by continuously changing the alignment of the measurement radiation, comprising determining a respective distance and a respective alignment of the measurement radiation emitted for a distance measurement for scanning points lying within the specified scanning region, in particular with a predetermined scanning point resolution, and comprising producing a point cloud, representing the surface information and having the scanning points, in the internal coordinate system. Moreover, such referencing, in particular automatic referencing, of the internal coordinate system in relation to the external coordinate system on the basis of at least the position reference to the external coordinate system provided by the reference point and the specified direction to the reference point is carried out in the internal coordinate system, so that at least one orientation, in particular a position, of the point cloud is determined in the external coordinate system.

Thus, according to the invention, it is possible both to detect an object area with a predetermined point-to-point resolution in a scanning manner (e.g. with a measuring rate of 1000 to 10 000 or more measurement points per second and with a measuring range, corresponding to geodetic scales, in the range of kilometers) and to sight and survey an individual reference point in a very accurate fashion. By scanning, a point cloud is derived for the object to be surveyed, wherein the position, orientation and scaling of the cloud is initially only known and determined in the internal coordinate system of the surveying device and, as a result of this, (only) relative statements can be made about the object in relation to the internal reference system.

In order to determine e.g. an absolute position, orientation and/or spatial extent of the point cloud, the point cloud has to be registered in an overarching (external) coordinate system, i.e. the internal coordinate system is referenced in relation to the overarching coordinate system. According to the invention, this registration is brought about by surveying the individual reference point (or several reference points), the position of which is known e.g. in the overarching coordinate system (i.e. the point provides a position reference to the external coordinate system). As a result of this information (known position in the overarching coordinate system and, as a result of the surveying, at least the known direction to the point in the internal coordinate system), there now is mutual referencing of the coordinate systems, i.e. the point cloud is registered in the overarching coordinate system.

As a result, the position, the orientation and also the scaling of the point cloud and, furthermore, also the orientation and/or position of the object and the spatial extent thereof are determined and known in this external system.

Here, the steps of scanning, reference point surveying and mutual registration are, according to the invention, all carried out using and by the surveying device (or a controller assigned to the surveying device). Therefore, no additional post-processing step is required anymore for registering the point cloud.

According to the invention, for the provision of the position reference to the external coordinate system, an absolute position of the at least one reference point in particular is known in the external coordinate system and the referencing is brought about on the basis of the known absolute position of the at least one reference point.

Within the scope of the invention, the at least one reference point can be provided, in particular, in the external coordinate system by a geodetically referenced calibration point or a retroreflector or a geodetic surveying device set up with known positioning or alignment.

In accordance with a special embodiment of the invention, a distance to the at least one reference point and a position of the reference point are determined in the internal coordinate system and the referencing is brought about on the basis of the determined position of the reference point in the internal coordinate system.

In respect of the embodiment of the scanning procedure, according to the invention especially within the scope of scanning when determining the respective distance and the respective alignment of the measurement radiation, the alignment of the measurement radiation is modified continuously within the specified scanning region. As a result of this, real scanning sensing of an object surface can be achieved, wherein measurements can be carried out sufficiently precisely during the movement of the measurement beam using a geodetic surveying device according to the invention, in particular using a total station or a theodolite.

Such scanning using a geodetic surveying device substantially can be achieved by the use of highly accurate, fast and precisely controllable actuators or servomotors, as a result of which the sighting unit of the surveying device, and hence the measurement radiation, can be guided in a fast, exact and continuous manner and the angular positions of the sighting unit and distances for targeting can be measured simultaneously. The control and evaluation unit of the device is moreover configured in such a way that the detected measurement data can be processed correspondingly quickly.

Within the scope of referencing, the internal coordinate system, according to the invention, can be adapted in such a way, in particular in respect of position and scaling of the internal coordinate system, that the internal coordinate system coincides with the external coordinate system, in particular corresponds to the external coordinate system. To this end, the internal coordinate system can be rotated and/or offset and/or the scaling thereof can be modified in an appropriate manner. Then, the internal coordinate system is, in particular, identical to the external coordinate system.

In accordance with a further special embodiment of the invention, the internal coordinate system is referenced in relation to the external coordinate system on the basis of further reference information, in particular on the basis of additional GNSS position information and/or on the basis of an additional point common to both the internal and external coordinate system, the position of which point, for example, is determined by an individual point measurement.

In respect of taking into account currently present measurement conditions, according to the invention, atmospheric state information can be detected and/or geometric measurement information can be defined within the scope of the surveying method, in particular in the form of meteorological data or measurement axis error, in particular ambient temperature, air pressure and/or atmospheric humidity.

In particular, in this context, the atmospheric state information and/or geometric measurement information is processed when determining the distance for the respective scanning points and/or when determining the distance to the at least one reference point and there is a distance correction for determining the respective distance on the basis thereof. Alternatively, or in addition thereto, the scanning points determined within the scope of the scanning can be adapted in respect of the position thereof in the external coordinate system, in particular the orientation of the point cloud in the internal coordinate system, on the basis of the atmospheric state information and/or geometric measurement information.

In other words, such state information can also be detected during a measurement procedure (individual point measuring or scanning) and a measurement correction can be undertaken on the basis of this information. Here, the correction can be established by means of e.g. a "look-up table", by means of which an associated correction value is defined for e.g. a specific ambient temperature.

In accordance with a further special embodiment of the invention, at least one further instance of scanning of further scanning points is carried out, a further point cloud having the further scanning points is derived in a further coordinate system, geodetically accurate individual point measuring in respect of the at least one reference point and/or in respect of a further reference point, with determination of at least the direction to the reference point and/or to the further reference point in the further coordinate system, is carried out and the further coordinate system is referenced in relation to the external coordinate system on the basis of at least the determined direction to the reference point in the further coordinate system. These two steps of further scanning and individual point measuring take place, in particular, with an identical setup of the surveying device such that a specified individual point measuring procedure can be assigned to a scanning procedure.

In particular, in this case, the scanning and the at least one further instance of scanning is brought about from different perspectives from different setup points, wherein the orientations (or positions) of the respective point clouds are determined in the external coordinate system and hence the orientations of the respective point clouds are determined relative to one another.

Using this method variant according to the invention, it is possible, for example, for a plurality of point clouds of one or more objects to be detected from different perspectives and for these point clouds to be referenced with respect to one another or registered in an external coordinate system such that these are available in a common coordinate system. By way of example, all point clouds are referenced in a common overarching system such that the relative position and scaling is defined in this system for each point cloud.

As a result, e.g. the spatial extent and/or the form of an object detected from a plurality of perspectives can be accurately reconstructed and a model for the object true to reality can be created on the basis of the produced point clouds.

The scanning proceeding from different setup points (and hence the linked respective referencing of the point cloud produced thereby) can be brought about using one surveying device and changing setup of the device at these setup points. Alternatively, a plurality of geodetic surveying devices can be used at the different setup points for this.

In respect of an increase in the accuracy of the positions determined for the scanning points, there is, according to a special embodiment of the invention, at least partial, mutual adapting of positions of the specified scanning points and/or of the further scanning points in the external coordinate system, in particular there is a position correction, on the basis of the referencing of the internal coordinate system and the further coordinate system in relation to the external coordinate system.

According to the invention, the geodetic surveying method is carried out by and using the geodetic surveying device, wherein the surveying device comprises at least one scanning functionality for detecting the scanning points by scanning and producing the point cloud and one individual point measuring functionality for highly precisely determining the direction to the reference point. In particular, the surveying device for carrying out the surveying method is embodied according to any one of the embodiments set forth below. According to the invention, the method steps of scanning, individual point measuring and referencing are all carried out using the surveying device (in particular in respect of the scanning and individual point measuring) and directly on the surveying device (in particular in respect of the referencing).

The invention also relates to a geodetic surveying device, in particular a total station or multi-station, comprising a base defining a pivot axis, a structure which is arranged on the base and can pivot relative to the base about the pivot axis, wherein the structure defines a tilt axis which is substantially orthogonal to the pivot axis, and comprising a sighting unit, in particular a telescopic sight, wherein the sighting unit is arranged such that it can pivot relative to the structure about the tilt axis and has an emission unit with a beam source for generating and emitting measurement radiation. Moreover, the surveying device has a distance measuring functionality for measuring distances to points, an angle measuring functionality for measuring an alignment of the measurement radiation and a control and processing unit for data processing and for controlling the surveying device.

Moreover, the device has an individual point measuring functionality, wherein the individual point measuring functionality can be carried out by the control and processing unit in such a way that at least one reference point can be surveyed in a geodetically accurate fashion by aligning the measurement radiation in a highly precise fashion therewith, wherein a position reference to an external coordinate system is provided by the at least one reference point, and such that at least one direction to the reference point can be determined in the internal coordinate system of the surveying device when aligning the measurement radiation on the at least one reference point.

In other words, when carrying out the individual point measuring functionality controlled automatically by the control and processing unit, the measurement radiation is aligned highly precisely on at least one (scanning point-independent) reference point, wherein a position reference to an external coordinate system is provided by the at least one reference point, in particular wherein an absolute position of the reference point is known in an external coordinate system, the reference point is surveyed in a geodetically accurate manner and at least one direction to the reference point is determined in the internal coordinate system.

According to the invention, the surveying device is furthermore equipped with a reference point-independent scanning functionality, wherein the scanning functionality can be carried out by the control and processing unit in such a way that the scanning points can be surveyed with a predetermined scanning point resolution by continuously changing the alignment of the measurement radiation on scanning points lying within a specified scanning region and a point cloud with the scanning points can be produced in an internal coordinate system of the surveying device. Here, the alignment of the measurement radiation is changed at all times, in particular continuously, such that, as a result thereof, the scanning points within the scanning region can be scanned successively.

In other words, when the scanning functionality is carried out controlled automatically by the control and processing unit, there is scanning with a continuous changing of the alignment of the measurement radiation on scanning points lying within a specified scanning region and surveying of the scanning points with a predetermined scanning point resolution and producing a point cloud with the scanning points in an internal coordinate system of the surveying device.

The surveying device additionally has a referencing functionality, wherein there is, when the latter is carried out by the control and processing unit, referencing of the internal coordinate system in relation to the external coordinate system on the basis of at least the position reference to the external coordinate system provided by the reference point and the direction to the reference point in the internal coordinate system, which can be determined by the individual point measuring functionality, such that at least one orientation of the point cloud is determined in the external coordinate system.

In accordance with a special embodiment according to the invention of the surveying device, the control and processing unit is configured in such a way that a geodetic surveying method as described above can be carried out using the geodetic surveying device.

For improved user-friendliness, the surveying device can comprise, in particular, a remote control unit with an evaluation unit, wherein the referencing functionality can be carried out by the evaluation unit and/or comprise a display unit for depicting measurement information, in particular wherein a scanning progress can be depicted by at least partial depiction of scanning points of a point cloud.

In order to detect further position-relevant information, the surveying device according to the invention comprises, in a special configuration level, a GNSS module for detecting GNSS position information, in particular wherein the GNSS position information can be processed for correcting the position of the scanning points and/or of the point cloud in the external coordinate system and/or for adapting measured values during the scanning point survey and/or reference point survey.

By way of example, such GNSS information can be used to carry out a so-called "smart-station setup", i.e. that, for example, the direction to a connection point with a surveying device ("smart station") is measured, but the coordinates of this measured point are not (yet) known. The position of the point only becomes known by subsequent positioning of the surveying device on the connection point, wherein a position determination by means of GNSS occurs at this point. As soon as this point becomes known as a result of this, the orientation of the first setup (i.e. when sighting the connection point) is calculated and updated by taking into account the established point position. Here, a point cloud produced in the first setup can accordingly also be updated.

In particular, the surveying device can be embodied in such a way that the sighting unit comprises an imaging system with an imaging optical system having a focusing group and an image plane for producing and graphically providing an imaging of a sighting visual field, in particular wherein the sighting visual field is defined by the imaging system and the imaging of the sighting visual field in the image plane can be provided graphically in focus by means of image focusing by the focusing group.

The invention moreover relates to a computer program product with program code, which is stored on a machine-readable medium. The computer program product is configured to control the scanning and the individual point measuring and carry out the referencing of the internal coordinate system in relation to the external coordinate system in accordance with any one of the above-described geodetic surveying methods, in particular if the program is executed on an electronic data processing unit embodied as control and processing unit of a surveying device according to the invention or on an electronic data processing unit embodied as evaluation unit of a surveying device according to the invention.

BRIEF DESCRIPTION OF THE SEVERAL VIEWS OF THE DRAWING(S)

The method according to the invention and the apparatus according to the invention will be explained in more detail in a purely exemplary manner below on the basis of specific exemplary embodiments schematically depicted in the drawings, wherein further advantages of the invention will also be discussed. In detail.

DETAILED DESCRIPTION OF THE INVENTION

Figure 1:
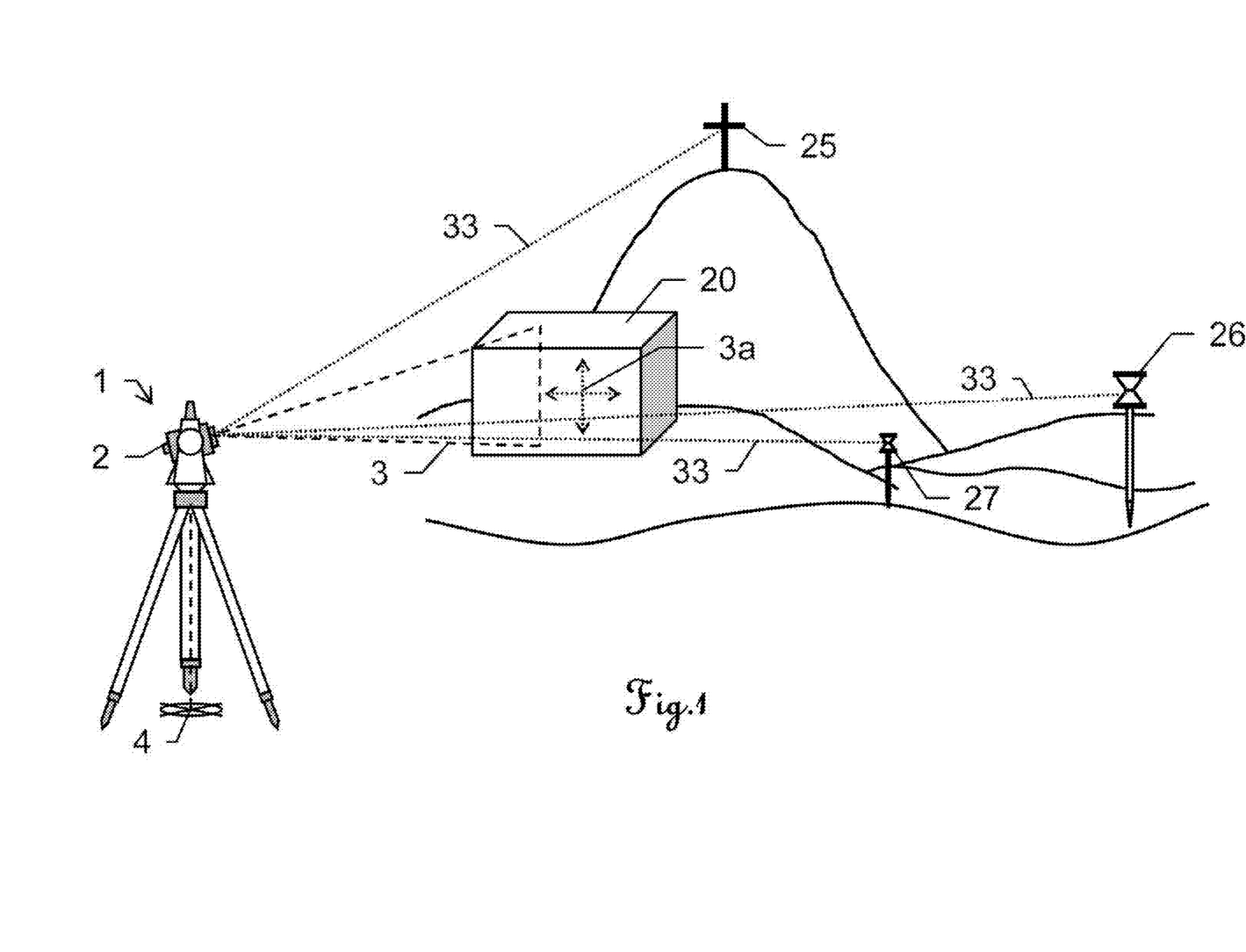
FIG. 1 shows a surveying device according to the invention, an object to be detected and targets specifying reference points.

FIG. 1 shows a surveying device 1 according to the invention, in particular embodied as total station or multi-station, with a base, a support, which can be pivoted relative to the base about a pivot axis, and a sighting unit 2 which can be pivoted about two axes—pivot axis and tilt axis—wherein the tilt axis is defined by the support. Moreover, an object 20 to be surveyed, two retroreflectors 26, 27 and a summit cross 25 on an elevation are shown.

A multi-station comprises the typical functionalities of a total station and moreover has a fast and very accurate scanning functionality, wherein, substantially on the basis of improved control motors (which can be actuated more quickly and act more quickly, and are more powerful), faster and more precise alignment of the sighting apparatus can be achieved. As a result, it is possible to scan a multiplicity of points in a predefined measurement region within a relatively short period of time and to create a corresponding point cloud with the scanned points. By way of example, it is thus possible to detect 1000 measurement points per second while changing the alignment of the measurement radiation (for scanning the object 20). As a result of the achievable measurement accuracy (accuracy within the scope of a (in respect of the measurement duration) appropriate geodetically accurate individual point survey) in conjunction with the high measurement speed and the scanning point resolution that can be realized thereby, this scanning procedure can be referred to as real scanning.

The surveying device 1 has a scanning function, in which, when it is carried out, scanning points are measured within a predefined scanning region (here the scanning region corresponds substantially to the spatial extent of the object visible from the setup of the device) and a point cloud representing object surface information is produced using the surveyed scanning points. Here, the scanning is brought about by successive and continuous alignment of the sighting unit in such a way that the scanning points are scanned and surveyed in succession. Here, a distance and a direction to the respective scanning point is determined in the internal reference system of the device 1 for each scanning point, i.e. a pivot angle, which specifies the relative position of the support with respect to the base, and a tilt angle, which specifies the position of the sighting unit 2 relative to the support. Accordingly, a distance and angle measuring functionality are provided.

For the distance measurement, measurement radiation 3 is emitted by means of the sighting unit 2 and aligned on the scanning region. Typically, (collimated) laser radiation, which can be produced by a laser diode provided on the surveying device 1, is used as measurement radiation 3. The measurement radiation 3 is guided by aligning the sighting unit in such a way that the scanning region is scanned with a predetermined scanning point resolution (see arrows 3a).

According to the invention, the surveying device 1 is embodied in such a way that—depending on the desired scanning point resolution and distance to the object 20 to be surveyed—e.g. 250 or 1000 scanning points are detected per second during such scanning.

What emerges as a result of the scanning process is a point cloud 20a (cf. FIG. 3a), i.e. a multiplicity of measurement points, wherein a respective direction of the measurement radiation 3 and a distance value are determined for each measurement point and, as a result of this, the coordinates of the relevant measurement points are known in the internal coordinate system of the measuring device 1. Here, the point cloud 20a comprises those scanning points which can be detected (are visible to the surveying device 1) from the position of the object 20 relative to the surveying device 1.

Figure 3A:
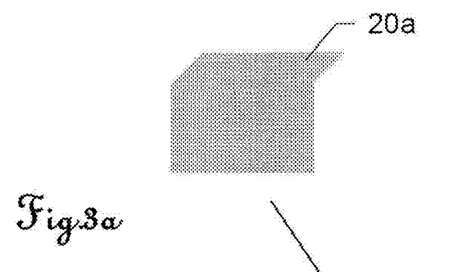
FIGS. 3a-c show respective point clouds for an object produced within the scope of scanning or referencing according to the invention.

By way of example, the spatial extent and the form of the object 20 can be derived from the point cloud 20a. Additionally, an intensity value for the measurement radiation 3 detected by the surveying device 1 and reflected on the object 20 can be measured for each measurement point, as a result of which additional information can be derived about the surface condition of the object 20, e.g. material information.

Moreover, the point cloud 20a can be colored e.g. on the basis of an additionally detected panoramic image of the scanned measurement surroundings (e.g. based on the RGB values of the corresponding detected image). Hence, additional image information can be superposed on the point cloud 20a.

Therefore, it is possible to produce information for the object 20 by means of the point cloud 20a, but it is not possible to derive a reliable and precise statement about a (relative) spatial position and/or alignment of the object 20.

In order to determine a spatial position of the object 20 (or of the point cloud 20a) or to determine the position relative to other objects or coordinate systems, it is necessary to establish a reference to an external coordinate system (=other coordinate system), which e.g. makes it possible to establish an absolute geodetic position reference.

According to the invention, to this end, the surveying device 1 has, in addition to the scanning functionality, an individual point measuring functionality, within the scope of which geodetically accurate sighting and measuring of a specific individual target point (reference point) can be carried out. To this end, the measurement radiation 33 is initially aligned precisely on the point to be surveyed. During this individual point measurement, the measurement radiation 33 remains with a defined alignment to the respective point to be measured accurately, while the alignment of the measurement radiation 33 is changed continuously during the scanning. In particular, this alignment is brought about manually by the user, wherein the user can optically accurately sight the target point by means of a reticle using a telescope provided in the sighting unit 2, or by an automatic target recognition (ATR) function, wherein an impact point of the reflected measurement radiation 33 is detected on a position-sensitive detector and, on the basis of this, there is a motor-driven, controlled alignment.

By sighting three reference targets (retroreflectors 26, 27 and summit cross 25), the coordinates of which are known in the external coordinate system and which serve as reference points, the surveying device 1 can be calibrated in the external coordinate system (=the position and alignment of the surveying device 1 is determined in the external coordinate system) and, as a result of this, it is possible to determine a position and/or orientation relationship between the internal coordinate system (or the point cloud 20a) and the external coordinate system.

For this, the surveying device 1 comprises an appropriate referencing functionality. Here, the surveying device 1 for surveying the three reference targets 25-27 and for the scanning procedure is available with the same setup, i.e. the surveying device 1 is not moved between the scanning and the individual point measuring procedure. For precise calibration with three known reference points 25-27, determining the respective direction to the reference points 25-27, i.e. the respective pivot and tilt angles, is sufficient without an additional distance measurement in respect of the references 25-27, but the distance can additionally be determined, for example for a more accurate position determination of the surveying device 1 in the external coordinate system.

Therefore, as a result of the highly precise calibration, e.g. a common point, in particular the setup point 4 of the surveying device 1, for both coordinate systems and a respective orientation of the system are known. As a result of this, the internal coordinate system can be referenced in relation to the external coordinate system, for example by rotating, translating and/or scaling the internal coordinate system, and e.g. an appropriate coordinate transformation for the point cloud 20a can be carried out.

If reference measurements were already carried out using the surveying device 1 and, as a result of this, the setup of the device 1 is defined, the point clouds produced by means of the scanning can be produced directly with reference to the external (absolute) coordinate system.

In the case where, for example, the setup point 4 for positioning the surveying device 1 is known, a single measurement in respect of a known point 25-27 suffices for the calibration, as a result of which the direction to this point, and hence an alignment of the surveying device 1, can be determined.

If use is made of a first and a second surveying device 1, mutual sighting of the surveying devices 1 suffices for calibrating the second surveying device 1, wherein the setup point 4 and the spatial orientation for the first device 1 are known in the external coordinate system.

In addition to the calibration routines described or sketched out above, the geodetic surveying device 1 can also be calibrated according to alternative methods known from the prior art.

The scanning resolution and hence the achievable accuracy for determining the position when surveying points during the scanning are, due to the method, significantly lower than the achievable accuracy during a geodetic individual point measurement. During a scanning, the measurement beam 3 is moved substantially continuously, which significantly limits a measurement duration for each individual point. In particular, in so doing, integration is carried out over a specified measurement time (dependent on the desired resolution) for each measurement point, wherein the measurement beam 3 is moved. By contrast, during an individual point measurement, the measurement beam 33 is aligned exactly on the target and kept in this alignment. Hence, a significantly greater accuracy can be achieved by the individual point measuring by registering (referencing) the point cloud 20a, in a manner according to the invention, in the external coordinate system and hence the position of the point cloud 20a is determined substantially more precisely in the external reference system—compared to a registration based on the measured scanning points.

In so doing, it is moreover advantageous that registering the point cloud 20a takes place directly on and using the surveying device 1 and that, for this, there is no need for time-consuming data transmission to a separate computer system embodied specifically for this purpose. Furthermore, as a result of this, the user can follow an overall scanning progress, even when measuring a plurality of point clouds from different setups of the surveying device 1.

For registering the point cloud 20a, it is moreover irrelevant whether this registration (or the calibration of the surveying device 1 in the external coordinate system) takes place prior to the scanning and detecting of the point cloud 20a for the object 20 or after the scanning. Therefore, the point cloud 20a can still also be referenced in respect of its spatial position or orientation in the external coordinate system even after being produced.

Since the individual point survey can be carried out, reference targets 25-27 can be surveyed for registering the point cloud with geodetic accuracy at greater distances (e.g. summit cross 25) than would be possible within the scope of the scanning process. As a result of this, substantially more accurate referencing of the point cloud is realized in the external coordinate system.

Figure 2:
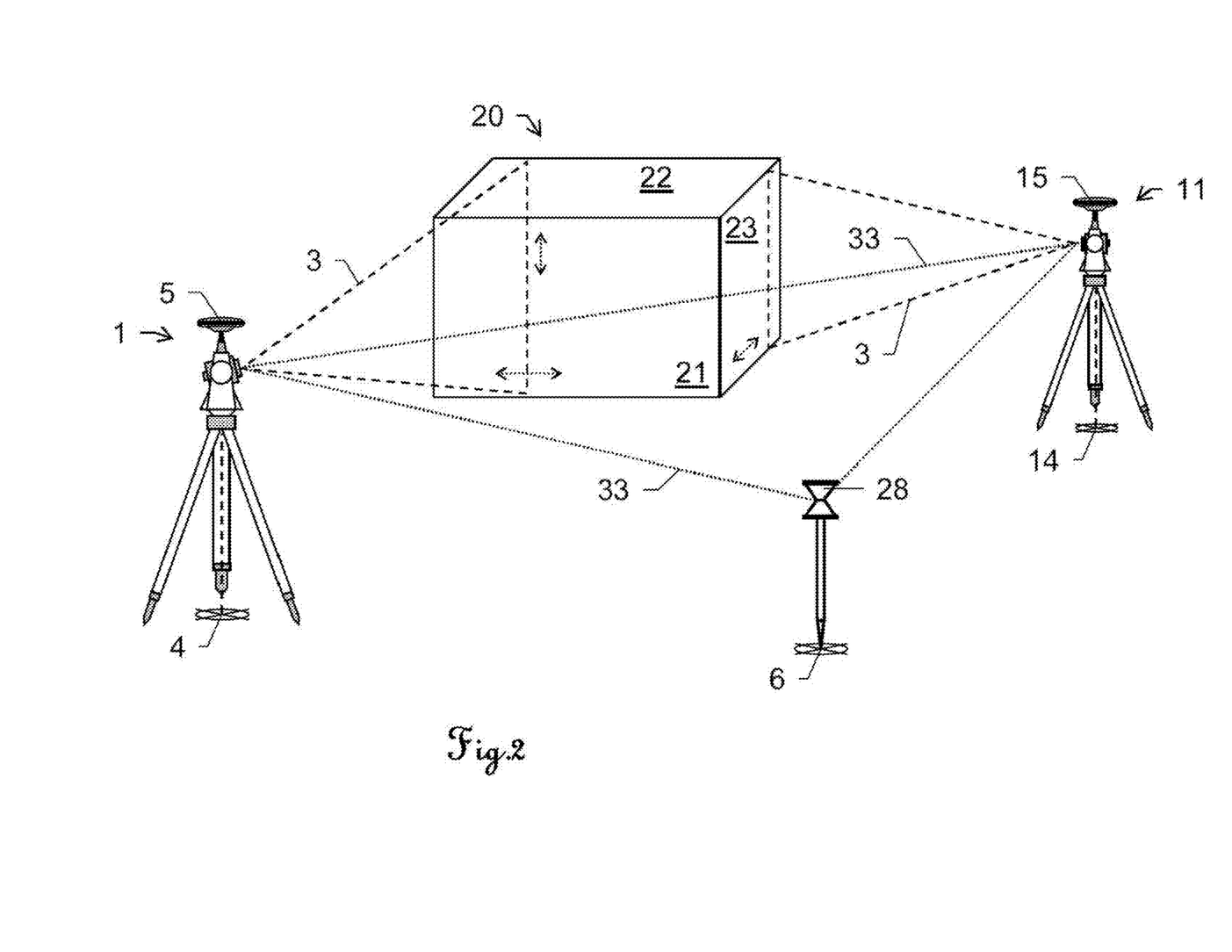
FIG. 2 shows two geodetic surveying devices according to the invention and the detection of an object from different perspectives.

FIG. 2 shows two geodetic surveying devices 1, 11 (multi-stations) according to the invention, an object 20 to be surveyed and a retroreflector 28. By using a plurality of surveying devices 1, 11, the object 20 can e.g. be detected from different perspectives or a larger measurement region can be covered.

In a first setup of the first surveying device 1 (=positioning of the device 1 at a first setup point 4) the object 20 is scanned and a corresponding first point cloud 20a (cf. FIG. 3a) is produced. Here, the point cloud 20a consists of scanning points which were detected on the faces 21, 22 of the object 20 using the surveying device 1. The surface 23 of the object 20 cannot be sighted or scanned from the setup position 4.

Using the second surveying device 11, the object 20 is scanned from a second setup position 14. During the scanning procedure using the second surveying unit, the face 23 of the object 20 is detected and a corresponding point cloud 20b (cf. FIG. 3b) is produced, wherein the two faces 21, 22 cannot be sighted by the measurement radiation 3 from the perspective of the second device 11.

Figure 3B:
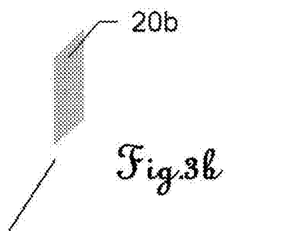

The two point clouds 20a-b therefore are available in two different internal coordinate systems, which are respectively assigned to the respective surveying device 1, 11. There is no relative reference of the two point clouds 20a-b with respect to one another.

In order to obtain a common point cloud 20c (cf. FIG. 3c), which represents both the faces 21, 22 and the face 23 of the object 20 with true accuracy, the two point clouds 20a-b are referenced to one another. According to the invention, the referencing of the point clouds 20a-b in a common coordinate system can be obtained by virtue of the fact that the first surveying device 1 (as reference point) is sighted very precisely by the second device 11 within the scope of an individual point survey and, in so doing, a distance between the devices 1, 11 and an alignment of the second device 11 is detected. Moreover, the second device 11 is accordingly sighted by the first one (depicted by the measurement radiation 33 which in each case is emitted and can be received). As a result, the relative positioning and alignment of the surveying devices 1, 11 (and hence also of the internal coordinate systems) is known and the two point clouds 20a-b can be transferred into a common coordinate system (e.g. into the coordinate system of the first surveying device, which in this case is to be considered to be an external coordinate system) or referenced to one another (by means of the referencing functionality according to the invention).

Figure 3C:
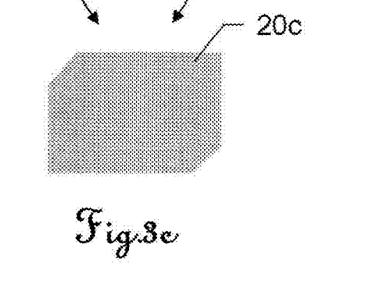

As a result of the referencing according to the invention, the point clouds 20a-b can be linked relative to one another in such a way and the scanning points thereof can be combined to form an overall point cloud 20c in such a way that the object 20 is represented in more detail by this combined point cloud 20c than by only one of the point clouds 20a-b.

The two surveying devices 1, 11 can moreover each have a GNSS receiver 5, 15, by means of which, in each case, a position information from a satellite system can be received (e.g. GPS signals, GLONASS signals or Galileo signals). By means of this position information, an absolute position in the Earth's coordinate system can be determined for each of the surveying systems 1, 11, wherein, as result of the alignment of the devices 1, 11, which can likewise be determined (see above: mutual sighting; however, for this the determination of the measurement direction suffices), the absolute alignment of the devices moreover can be determined (e.g. North/East alignment). Using this information, the point clouds 20a-c can be registered in this external coordinate system (Earth's coordinate system). The positions of the point clouds 20a-c and also the position (location and orientation) of the object 20 can thus be determined in this system. Therefore, absolute coordinates for the object 20—which are independent coordinates of the internal coordinate systems of the surveying devices 1, 11—can be derived.

As an alternative to using the two surveying devices 1, 11, a single surveying device can be set at both setup points 4, 14 in succession and the object 20 can be scanned thereby in each case and the point clouds 20a-b can be produced. For each setup of the surveying device, there then is referencing according to the invention of the respectively produced point cloud 20a-b in relation to an overarching coordinate system, e.g. by precise individual sighting of the reflector 28, the position 6 of which is known in this overarching coordinate system (if the setup position 4, 14 is known in each case). Therefore, both point clouds 20a-b can be referenced in a common coordinate system.

If the positions of the setup points 4, 14 are unknown, there can be calibration in an external coordinate system by virtue of the fact that, in addition to the target 28 known in terms of its position, further targets (not depicted here), the positions of which are likewise known in the external coordinate system, are also surveyed by means of the individual point measuring functionality—at least in respect of the direction to these targets.

Furthermore, point clouds can be produced and referenced in relation to one another or registered in a common coordinate system by virtue of a first point cloud being scanned in the first setup position and, in this position, a reflector being surveyed exactly in a second position using the individual point measuring functionality. Subsequently, the setup positions of reflector and surveying device are interchanged, a further point cloud is scanned and the reflector is sighted precisely by means of individual point measurement and, as result of this, the relative position of the surveying device in relation to the reflector is determined.

By repeating these steps, i.e. setting up and precisely surveying the reflector at a third position and interchanging the position of the surveying device and the reflector (at the third position) and a further instance of such "backward measuring", it is possible to produce a sequence of mutually referenced measurements ("traverse"). The point clouds produced thereby can be provided and/or displayed—e.g. on a display of the surveying device—in a common coordinate system. By additional referencing in relation to an external coordinate system (e.g. in relation to the Earth's coordinates), it is moreover possible to calculate a position of the point clouds in this coordinate system, i.e. the absolute position of the point clouds (and objects represented thereby) in the Earth's coordinate system is determined.

Using this method, it is possible to bridge terrain regions in which there are only reference points which are difficult to measure or in which there are no reference points. A traverse is then started at a first known reference point and further bridging points are provided by means of the surveying device and surveying the position of a retroreflector relative to the surveying device. A subsequent measurement can be linked to these artificially provided points. Such a traverse is completed by surveying a further known, ultimate point. Here, all reference points artificially provided within the scope of the bridging can be updated in terms of their position on the basis of the known position of the ultimate point. Accordingly, there can also be a correction of the positions of point clouds produced within the scope of the traverse.

When producing a plurality of mutually referenced measurements, e.g. within the scope of a traverse, the measured values of the individual point clouds produced thereby can be used for a mutual adaptation. That is to say, if mutually overlapping measurement regions were detected by scanning, points in each case surveyed a number of times can be determined by a comparison with, in particular by forming an average of, the associated measured values after the respective point clouds were mutually referenced according to the invention by means of reference point measuring (individual point measuring) and the measuring points are known in terms of coordinates in the same coordinate system.

Moreover, when using a plurality of multi-stations (not shown here), by means of which there is in each case a measurement and production of a point cloud and a determination of an orientation to a reference point, there can be respective coordinate updating for all point clouds detected by the multi-stations when updating or adapting the coordinates of the reference point in such a way that these point clouds are available in an updated manner in a common coordinate system.

Figure 4:
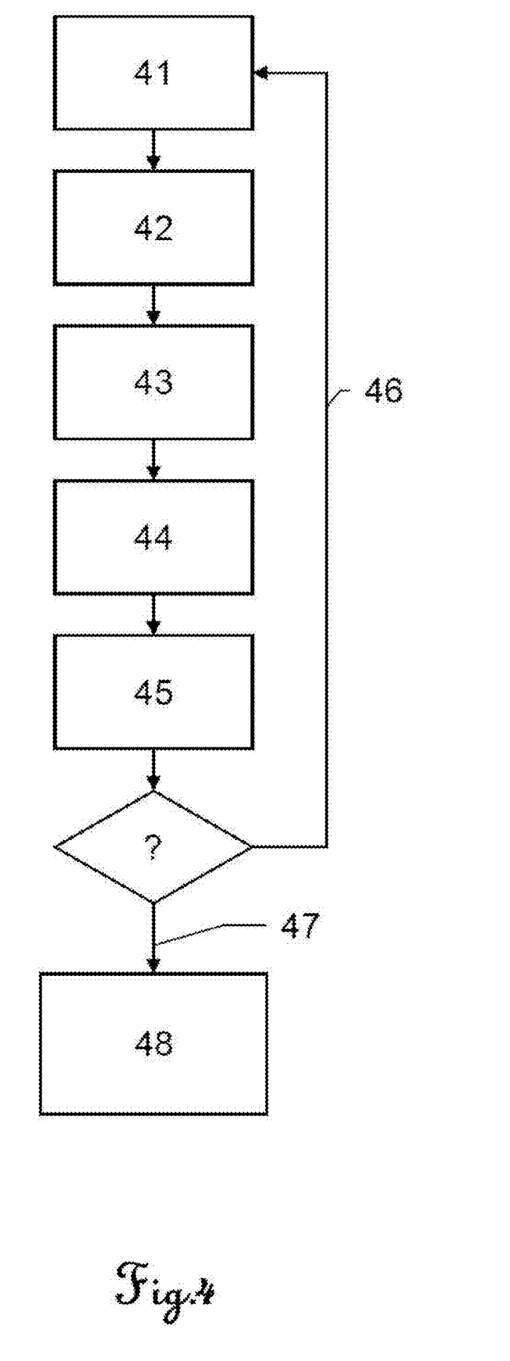
FIG. 4 shows a flowchart for a measurement procedure according to the invention.

FIG. 4 shows a flowchart for a measuring process with scanning and registering the point cloud produced during the scanning in a coordinate system according to the invention.

Initially, in a first step 41, a geodetic surveying device, which is embodied both for scanning objects and for highly precisely surveying an individual point (e.g. multi-station), is set up in a first setup.

Subsequently, by individual, geodetically accurate surveying of reference points, a calibration of the surveying device into an external coordinate system, which meets the measurement requirements, is undertaken (step 42), wherein, for example, a known point (i.e. a point with known position in the external coordinate system) is sighted. The measuring range for such an individual point measuring is significantly larger than an obtainable measuring range for scanning since the measurement radiation is aligned precisely on the measurement point and held during the whole measurement, and hence a longer measurement duration— i.e. an integration period with a longer time—can be achieved for a point.

Thereafter, in a further step 43, a scanning region is defined, within which scanning points are to be detected with a likewise to be determined point-to-point resolution. To this end, e.g. a speed for the deflection of the measurement beam and/or an integration time in respect of the measurement duration can be defined for each scanning point.

The object is then scanned 44 on the basis of the settings made in step 43 by guiding the measurement beam over the object within the defined scanning region and (simultaneous) measurement of angle and distance values to each scanning point. As a result of the scanning procedure, a point cloud with the scanning points in an internal coordinate system of the surveying device is produced.

After scanning 44, the point cloud is referenced 45 in the external coordinate system by means of the calibration values established in step 42 such that at least the orientation, in particular also the position, of the point cloud is known in the external coordinate system or such that a reference is determined between the internal and external coordinate system. As a result of this, object coordinates are available in this external coordinate system, i.e. a spatial extent and a position and orientation of the object.

According to the invention, steps 43 and 44 can be carried out before step 42.

After registering or referencing 45 the point cloud has taken place, the surveying device can optionally be positioned in a further setup for carrying out a further scan (step 46), wherein steps 42-45 are once again carried out in this further setup, or the measurement procedure is completed 47.

As a result 48 of the measurement process, one or more point clouds are obtained, wherein these are available directly in the correct (desired) coordinate system—e.g. in the Earth's coordinate system if the positions of the reference point are known therein—without an additional post-processing step (e.g. in the office workspace) having to be carried out for such registration.

Within the scope of the individual point measuring or scanning, it is furthermore possible to take account of atmospheric information, such as e.g. air pressure, temperature and/or atmospheric humidity present at the respective measurement, and the influence thereof on a respective measurement.

Alternatively, or in addition thereto, geometric correction data (e.g. in respect of a North alignment) can be taken into account during the respective measurement processes.

Specifically, the referencing according to the invention of the point cloud can be carried out with a different coordinate system by means of a controller of the surveying device. In particular, the control is provided for remote control of the device.

It is understood that the depicted figures only depict possible exemplary embodiments in a schematic manner. According to the invention, the various approaches can likewise be combined amongst themselves and with methods and apparatuses for geodetic target surveying and with surveying devices, in particular total stations or multi-stations, in the prior art.

What is claimed is:

1. A geodetic surveying method for referencing a coordinate system of a geodetic surveying device, the method comprising:
    deriving surface information for an object in respect to an internal coordinate system of the geodetic surveying device; and
    geodetically accurate individual point measuring to at least one reference point, wherein
        a position reference to an external coordinate system is provided by the at least one reference point,
        measurement radiation is aligned precisely on the at least one reference point and
        at least one direction to the reference point is determined in the internal coordinate system when the measurement radiation is aligned on the at least one reference point,
wherein reference point-independent scanning for deriving the surface information comprises:
    scanning of a scanning region, specified in respect of the object, by continuously changing the alignment of the measurement radiation;
    determining a respective distance and a respective alignment of the measurement radiation emitted for a distance measurement for scanning points lying within the specified scanning region, in particular with a predetermined scanning point resolution; and
    producing a point cloud, representing the surface information and having the scanning points, in the internal coordinate system and
wherein referencing of the internal coordinate system in relation to the external coordinate system is made on the basis of at least:
    the position reference to the external coordinate system provided by the reference point, and
    the specified direction to the reference point in the internal coordinate system, so that at least one orientation of the point cloud is determined in the external coordinate system.

2. The geodetic surveying method according to claim 1, wherein an absolute position of the at least one reference point is known in the external coordinate system and the referencing is brought about on the basis of the known absolute position of the at least one reference point.

3. The geodetic surveying method according to claim 1, wherein the at least one reference point is provided in the external coordinate system by at least one of the following:
   a geodetically referenced calibration point,
   a retroreflector, and
   a geodetic surveying device set up with known positioning or alignment.

4. The geodetic surveying method according to claim 1, wherein a distance to the at least one reference point and a position of the reference point are determined in the internal coordinate system and the referencing is brought about on the basis of the determined position of the reference point in the internal coordinate system.

5. The geodetic surveying method according to claim 1, wherein, within the scope of scanning, when determining the respective distance and the respective alignment of the measurement radiation, the alignment of the measurement radiation is modified continuously within the specified scanning region.

6. The geodetic surveying method according to claim 1, wherein, within the scope of referencing, the internal coordinate system is adapted in such a way that the internal coordinate system coincides with the external coordinate system, in particular corresponds to the external coordinate system.

7. The geodetic surveying method according to claim 5, wherein the internal coordinate system is adapted in respect of position and scaling of the internal coordinate system.

8. The geodetic surveying method according to claim 1, wherein the internal coordinate system is referenced in relation to the external coordinate system on the basis of further reference information.

9. The geodetic surveying method according to claim 1, wherein the internal coordinate system is referenced in relation to additional GNSS position information.

10. The geodetic surveying method according to claim 1, wherein the internal coordinate system is referenced on the basis of an additional point common to both the internal and external coordinate system.

11. The geodetic surveying method according to claim 1, wherein atmospheric state information is detected and/or geometric measurement information is defined within the scope of the surveying method, wherein
   the atmospheric state information and/or geometric measurement information is processed when determining the distance for the respective scanning points and/or when determining the distance to the at least one reference point and there is a distance correction for determining the respective distance on the basis thereof and/or
   the scanning points determined within the scope of the scanning are adapted in respect of the position thereof in the external coordinate system, in particular the orientation of the point cloud in the internal coordinate system, on the basis of the atmospheric state information and/or geometric measurement information.

12. The geodetic surveying method according to claim 1 wherein the geometric measurement information includes either particular meteorological data or measurement axis error, and atmospheric state information includes at least one of ambient temperature, air pressure and atmospheric humidity.

13. The geodetic surveying method according to claim 1, wherein
   at least one further instance of scanning of further scanning points,
   deriving a further point cloud having the further scanning points in a further coordinate system,
   geodetically accurate individual point measuring in respect of the at least one reference point and/or in respect of a further reference point, with determination of at least the direction to the reference point and/or to the further reference point in the further coordinate system and
   referencing the further coordinate system in relation to the external coordinate system on the basis of at least the determined direction to the reference point coordinate system, in particular wherein in the further the scanning and the at least one further instance of scanning is brought about from different setup points, wherein the orientations of the respective point clouds are determined in the external coordinate system and hence the orientations of the respective point clouds are determined relative to one another.

14. The geodetic surveying method according to claim 13, wherein there is at least partial, mutual adapting of positions of the specified scanning points and/or of the further scanning points in the external coordinate system on the basis of the referencing of the internal coordinate system and the further coordinate system in relation to the external coordinate system.

15. The geodetic surveying method according to claim 1 wherein the geodetic surveying method is carried out by and using the geodetic surveying device, wherein the surveying device comprises at least:
   one scanning functionality for detecting the scanning points by scanning and producing the point cloud; and
   one individual point measuring functionality for highly precisely determining the direction to the reference point.

16. A geodetic surveying device, comprising
   a base defining a pivot axis;
   a structure which is arranged on the base and can pivot relative to the base about the pivot axis, wherein the structure defines a tilt axis which is substantially orthogonal to the pivot axis;
   a sighting unit arranged such that it can pivot relative to the structure about the tilt axis and has an emission unit with a beam source for generating and emitting measurement radiation;
   a distance measuring functionality for measuring distances to points;
   an angle measuring functionality for measuring an alignment of the measurement radiation;
   a control and processing unit for data processing and for controlling the surveying device; and
   an individual point measuring functionality, wherein the individual point measuring functionality can be carried out by the control and processing unit in such a way that:
      at least one reference point can be surveyed in a geodetically accurate fashion by aligning the measurement radiation in a highly precise fashion therewith, wherein a position reference to an external coordinate system is provided by the at least one reference point, and
      at least one direction to the reference point can be determined in an internal coordinate system of the surveying device when aligning the measurement radiation on the at least one reference point,
   wherein the geodetic surveying device comprises:

a reference point-independent scanning functionality, wherein the scanning functionality can be carried out by the control and processing unit in such a way that the scanning points can be surveyed with a predetermined scanning point resolution by continuously changing the alignment of the measurement radiation on scanning points lying within a specified scanning region, and a point cloud with the scanning points can be produced in the internal coordinate system of the surveying device; and a referencing functionality, wherein there is, when the latter is carried out by the control and processing unit, referencing of the internal coordinate system in relation to the external coordinate system on the basis of at least:

the position reference to the external coordinate system provided by the reference point and the direction to the reference point in the internal coordinate system, which can be determined by the individual point measuring functionality, such that at least one orientation of the point cloud is determined in the external coordinate system.

17. The geodetic surveying device according to claim 16, wherein the surveying device comprises a remote control unit and/or a display unit, wherein the remote control unit includes an evaluation unit, wherein the referencing functionality can be carried out by the evaluation unit, and wherein the a display unit is used for depicting measurement information.

18. The geodetic surveying device according to claim 17 wherein a scanning progress can be depicted by at least partial depiction of scanning points of a point cloud.

19. The geodetic surveying device according to claim 16, wherein the geodetic surveying device comprises a GNSS module for detecting GNSS position information for correcting the position of the scanning points and/or of the point cloud in the external coordinate system and/or for adapting measured values during the scanning point survey and/or reference point survey.

20. A computer program product with computer-executable instructions, which is stored on a machine-readable medium, that when executed by a computer performs the following method:

controlling the scanning and the individual point measuring; and carrying out the referencing of the internal coordinate system in relation to the external coordinate system of the geodetic surveying method according to claim 1.

* * * * *